US005875329A

United States Patent [19]
Shan

[11] Patent Number: 5,875,329
[45] Date of Patent: Feb. 23, 1999

[54] INTELLIGENT BATCHING OF DISTRIBUTED MESSAGES

[75] Inventor: Yen-Ping Shan, Cary, N.C.

[73] Assignee: International Business Machines Corp., Armonk, N.Y.

[21] Appl. No.: 577,960

[22] Filed: Dec. 22, 1995

[51] Int. Cl.$^6$ .................................................. G06F 15/16
[52] U.S. Cl. ............................................ 395/680; 395/671
[58] Field of Search ................................ 395/200.02, 680, 395/200.61, 200.62, 200.7, 671, 672, 677, 731

[56] References Cited

U.S. PATENT DOCUMENTS

| | | | |
|---|---|---|---|
| 4,633,387 | 12/1986 | Hartung | 395/838 |
| 4,868,866 | 9/1989 | Williams | 380/49 |
| 4,914,653 | 4/1990 | Bishop | 370/85.6 |
| 5,115,392 | 5/1992 | Takamoto | 395/680 |
| 5,327,559 | 7/1994 | Priven | 395/671 |
| 5,367,643 | 11/1994 | Chang | 395/325 |
| 5,485,626 | 1/1996 | Lawlor | 395/650 |
| 5,592,672 | 1/1997 | Grewal | 395/200.15 |

OTHER PUBLICATIONS

Proceedings of Oopsla, Oct. 1994, Portland, Oregon, pp. 341–354, "Reducing Cross Domain Call Overhead Using Batched Futures", P. Bogel & B. Liskov.

Message–based efficient remote memory access on a highly parallel computer EM–X, 1994 Parallel Arch. Algorithms, Networks Symposium, IEEE, pp. 135–142.

*Primary Examiner*—Eric Coleman
*Attorney, Agent, or Firm*—Gregory M. Doudnikoff

[57] ABSTRACT

A technique is presented for enhancing performance of distributed applications. A sender loop thread in a sending node for sending messages to a destination node is provided with two different opportunities to gain access to the CPU. A batching priority is provided such that when a predetermined number of messages are in a queue for sending to the destination node, the sender loop thread is provided with access to the CPU. Further, the sender loop thread may gain access to the CPU when processing within the sending node is at a relative lull and any number of messages are waiting to be sent within the sending queue. This combination of techniques ensures that when a sufficient number of messages for batching are ready to be sent, they will be sent with minimal delay, while alternatively, if the number of messages have not reached the threshold for batching, but processing is at a relative lull, the messages will be sent anyway, thus utilizing the CPU and preventing unnecessary slowdowns in performance of the distributed application.

14 Claims, 5 Drawing Sheets

INTELLIGENT BATCHING OF DISTRIBUTED MESSAGES

BACKGROUND OF THE INVENTION

1. Field of the Invention

The present invention relates to a system, method and computer program for intelligently batching messages for distribution in a data processing system. More particularly, the present invention relates to a technique for intelligently batching messages for distribution across a process or nodal boundary for a distributed application.

2. Description of the Related Art

Distributed software applications (programs) have gained in popularity recently as they permit enhanced performance by distributing tasks among processors and utilizing otherwise under-utilized processing power. Distributed applications rely on multiple processes running in different nodes to perform or execute the application. Each process typically has multiple threads associated therewith and is usually associated a single computer or processor, although more than one process can exist on a given processor.

With the advent of object oriented languages, the full oriented applications execute by sending messages utilizing names between objects which comprise the application. This is fundamentally different from most applications written in procedural computer languages, in which code modules are identified by their address. This feature of object oriented applications potentially relieves the application developer of the horrific task of having to specifically hard code communications between threads of a distributed application operating in different nodes by local address in order to ensure proper node-to-node communication. In distributed object oriented applications, a "send thread" or routine is typically established within each node or process or object space or address space relative to each potential destination node or process or object space or address space to which messages may be sent.

Relatively slow performance or speed of object oriented applications has been identified as a drawback of using object oriented applications. While performance of object oriented applications operating within a single node has been greatly improved recently, performance issues for distributed applications have received much less attention. One major source of delays has been identified with regard to performance issues of distributed object oriented applications. The performance of a distributed application is greatly affected by the time it costs for messages to be sent from node to node over the network. Sending messages from object to object across nodal boundaries takes several times longer than does sending a message between objects within the same node or object space. The basic prior art technique for sending messages across nodal boundaries calls for simple polling of each send thread within a given process such that each sending thread is polled regularly, such as every 15 milliseconds, and if at least one message is ready or waiting to be sent, all waiting messages are sent. However, this technique is quite inefficient and affects performance because the send threads are constantly polled and responsiveness is tied to the frequency of polling. The less frequent the polling, the greater the amount of batching that occurs, but the application is less responsive. When the polling is more frequent, less batching of messages occurs and more CPU cycles are wasted, but the application is very responsive.

One approach to enhance performance has been the use of pure batching. Batching simply means sending more than one message at a time. A basic batching scheme for a distributed application calls for send thread within a given node to wait until a predetermined number of messages has been delivered to a batch queue for delivery to a destination node. After the number of messages is in the queue, the send thread is given CPU access within the node and the batch of messages is sent out over the network together in a single communication to the destination node. Batching takes advantage of the fact that the cost in time relative to sending more than one message over a network together is much less than the cost of sending each message separately. However, for many applications, and particularly for distributed object oriented applications, this technique may not improve performance significantly and can cause the loss of responsiveness and performance. In extreme cases, if a batch communication is not to be sent until, for example, three messages are in the batch queue, the first and second messages could arrive at practically the same time in the queue, but it may take many seconds or minutes before the third message arrives in the queue and the messages can be sent. Such delays are often not acceptable, as overall processing may be delayed until processing is carried out by objects in the remote node in response to receipt of the messages.

Another attempt to enhance performance calls for the send process relative to a given destination node to interrupt the processing whenever it receives a message to be sent, thus causing the message to be sent virtually immediately. But, once again, this technique fails to optimize performance of the overall application. While such a scheme is quite responsive, no batching will typically occur.

Accordingly, a need exists for a technique by which messages are sent across nodal boundaries which enhances system performance.

SUMMARY OF THE INVENTION

Accordingly, an object of the present invention is to provide a technique for enhancing the performance of distributed applications.

Another object of the present invention is to provide a technique which permits system administrators to adjust a message-sending algorithm or process so as to enhance performance for a particular distributed application.

Yet another object of the present invention is to minimize the number of network crossings and without sacrificing performance of a distributed system.

Other objects and advantages of the present invention will be set forth in part in the description and the drawings which follow, and, in part, will be obvious from the description, or may be learned by practice of the invention.

To achieve the forgoing objects, and in accordance with the purpose of the invention as broadly described herein, a system is provided in a computing environment executing a distributed application in at least a first address space and a second address space for causing a sender thread in the first address space to send messages destined for the second address space to the second address space via a network, the system comprising a sending queue in the first address space for receiving messages from threads in the first address space bound for the second address space; first means for determining whether a number of messages in the sending queue is greater than or equal to a predetermined number, and if so, causing the sender thread to send the messages in the sending queue to the second node in a single packet; and second means for determining whether at least one message is present in the sending queue, and if so, and if no higher priority thread is ready to run, causing the sender thread to send all of the messages in the sending queue to the second address space in a single packet. The first means may be a thread having a higher priority for being executed than the second means. The system may further comprise third means for permitting a user to change the predetermined number.

Computer readable code is also provided for sending messages from a first node to a second node, comprising first subprocesses in the first node for determining whether a number of messages in a send queue is equal to at least a predetermined number, and if so, causing the messages to be sent to the second node; and second subprocesses in the first node for determining whether at least one message is in the send queue and, if so, causing all messages to be sent to the second node. The first and second nodes may be carrying out processing for a distributed application, and the distributed application may be an object oriented application.

The first subprocesses may have a higher priority for being executed than the second subprocesses. Further, the computer readable code may further comprise third subprocesses for permitting the predetermined number to be modified by a user. Additionally, the messages are sent from the first node to the second node via a network. Preferably, both the first subprocesses and the second subprocesses send all messages in the send queue over the network to the second node in a single packet.

The present invention will now be described with reference to the following drawings, in which like reference numbers denote the same element throughout.

DESCRIPTION OF THE PREFERRED EMBODIMENT

Figure 1:
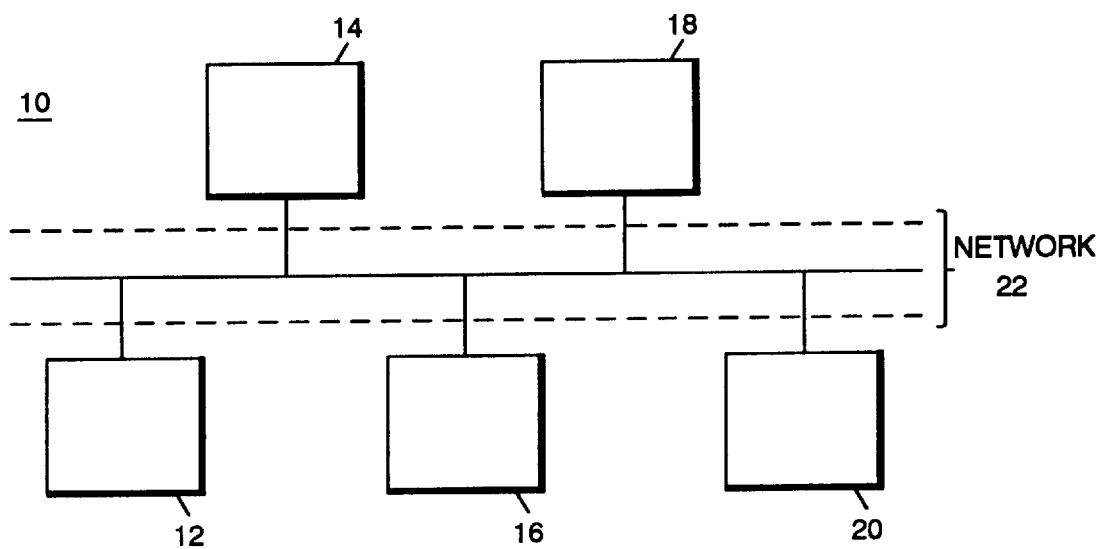
FIG. 1 illustrates a block diagram of a computing environment in which a distributed application may be executed.

The present invention will now be described relative to FIG. 1, which illustrates a known distributed computing environment 10 in which a distributed application may be executed. In this environment, personal computers or individual workstations 12, 14, 16, a server computer 18 and a mainframe computer 20 are interconnected via a network 22.

A distributed object oriented application may be executed in such an environment, with central processing units (CPUs) of the workstations 12, 14, 16, the server computer 18 and the mainframe computer 20 all being utilized by the application. The techniques by which the various functions of the distributed application are distributed among the different CPUs of the computers in the environment 10 are known and will not be discussed herein, and the same is true for the specific techniques for sending messages between address spaces or across nodal boundaries. The preferred embodiment is implemented in a distributed object oriented application written in the Smalltalk language, but the invention is directly applicable to other object oriented languages and may be utilized in some instances by procedural applications.

Figure 2:
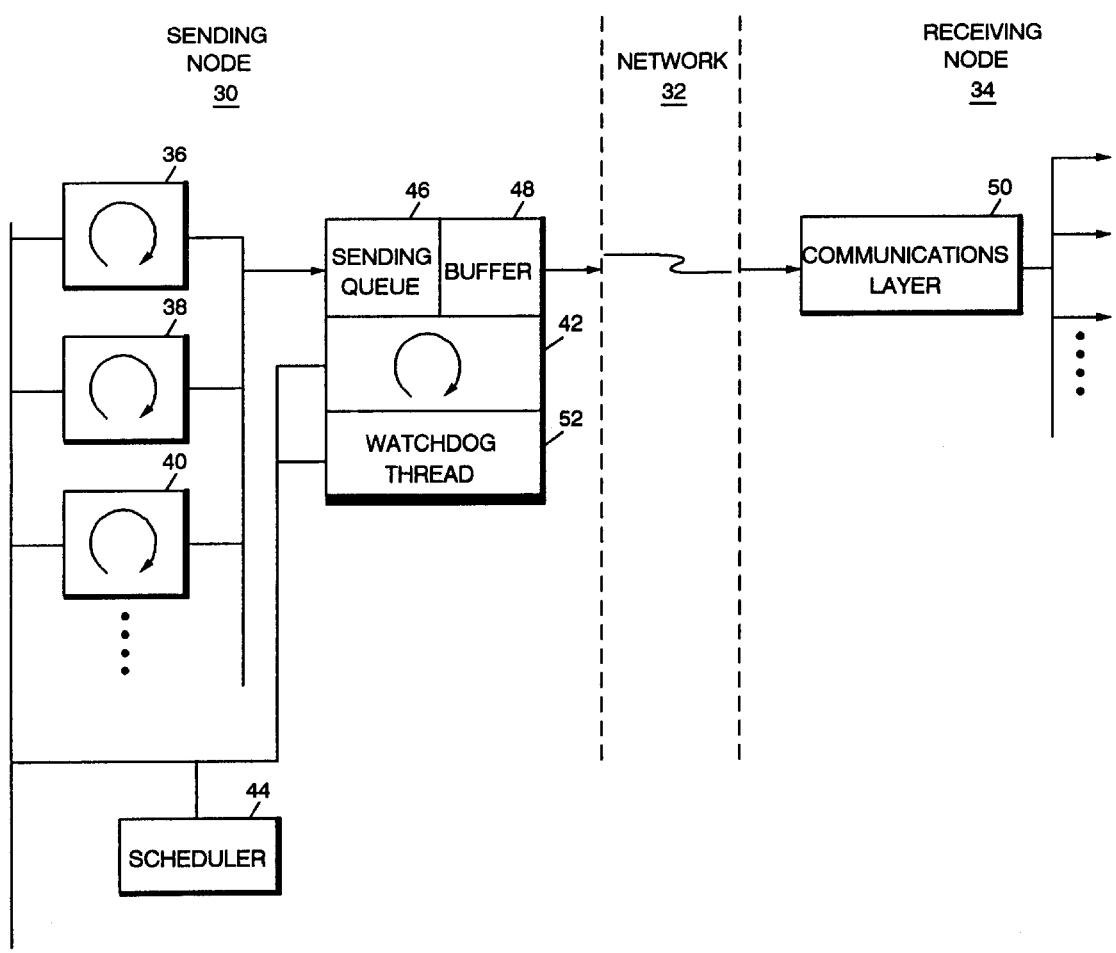
FIG. 2 illustrates diagrammatically the logical processing carried out to send messages from a sending node to a receiving node via a network in accordance with the present invention.

FIG. 2 schematically illustrates the flow of messages from a sending node 30 across a network 32 to a destination or receiving node 34. The sending node 30 operates in a first address space, while the receiving node 34 operates in a second address space. The sending and receiving nodes 30, 34 may run under the auspices of a single multi-processing central processing unit, which utilizes an operating system which permits multiprocessing. However, the more likely scenario is that the nodes 30, 34 are associated with the CPUs of separate computers.

The sending node 30 will have a number of threads 36, 38, 40 executing therein to perform the function assigned to that particular process being executed by the distributed application within the sending node 30. For each given receiving node associated with the distributed application to which messages may be sent by the threads 36, 38, 40 of the sending node 30, a sender loop 42 will be established within the sending node 30. The sender loop 42 is a thread which operates within the sending node 30. The process operating in the sending node 30 will typically have a scheduler 44 also operating therein which functions to delegate CPU time or access to the various threads operating within the sending node 30 so that the threads can execute their respective functions in an orderly manner. The basic function of a non-preemptive priority scheduler will be described with respect to the flowchart of FIG. 3. However, different types of schedulers may be utilized. Depending on the exact nature of the scheduler being utilized, the algorithm of the present invention may need to be modified somewhat to operate effectively therewith. But, such modifications should occur easily to those skilled in the art so as to effect the combination of two techniques for gaining CPU access in accordance with the present invention.

The sender loop 42 has associated therewith a sending queue 46 for receiving messages bound for the associated receiving node 34 from all the threads operating within the sending node 30. When the scheduler 44 gives the CPU to the sender loop 42 to execute its function, each message in the sending queue 46 is marshalled into a buffer 48. When all of the messages in the sending queue 46 have been marshalled in the buffer 48, a packet containing the marshalled messages is sent out over the network 32 to a communications layer 50 in the receiving node 34. The marshalling process involves taking each message apart and sequentializing it into bits to prepare for sending over the network 32 to the receiving node 34. In the communications layer 50 of the receiving node 34, the messages are reconstructed and sent on to the appropriate thread within the receiving node 34 for processing. The marshalling and reconstructing of messages is known and will not be further discussed herein.

A watchdog thread 52 is also associated with the sender loop 42. The functions of the scheduler 44, the watchdog thread 52 and the sender loop 42 will now be discussed with respect to FIGS. 3 through 5.

Figure 3:
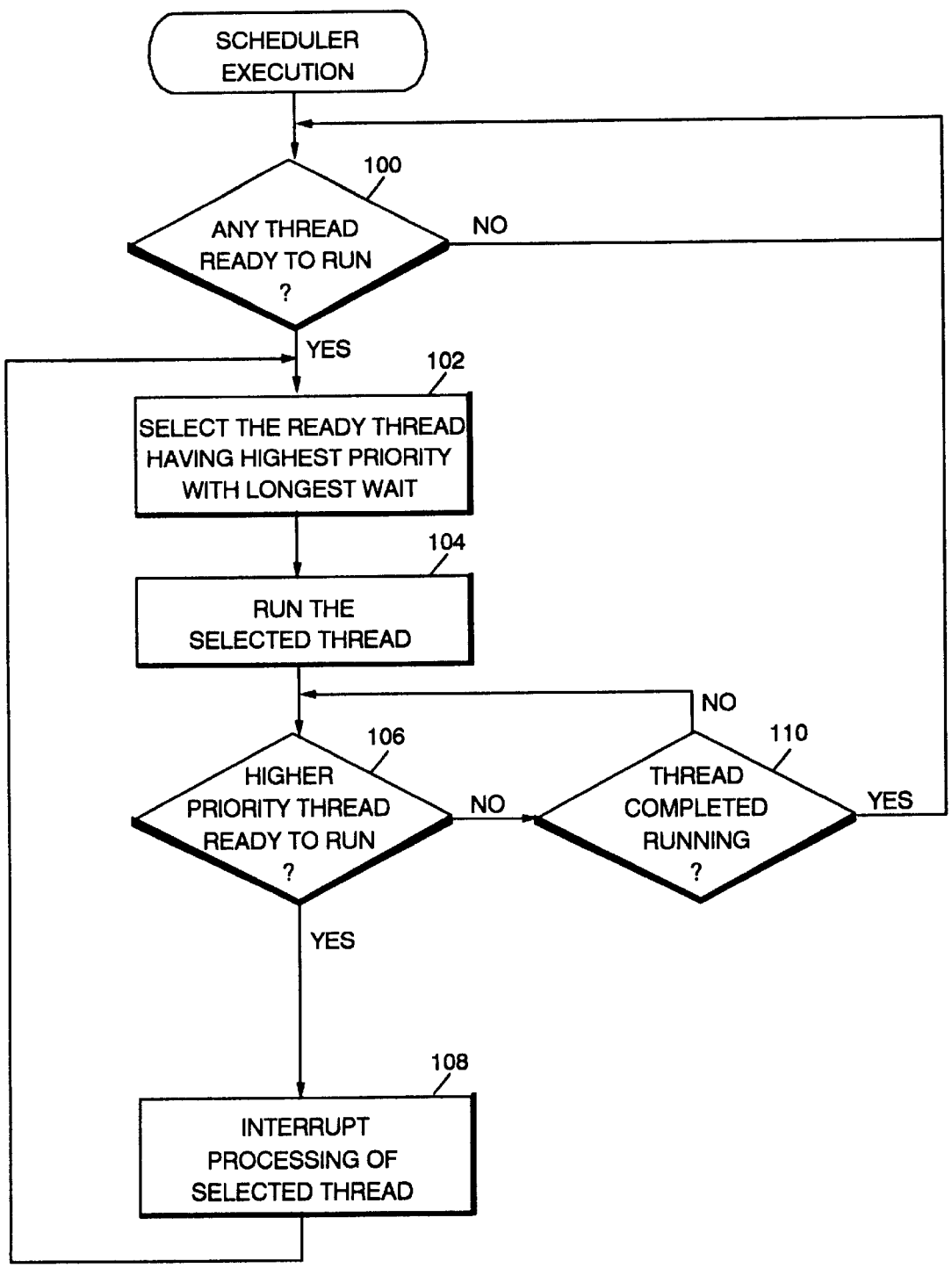
FIG. 3 illustrates a flowchart for a known priority scheduler.

FIG. 3 illustrates the basic function of a non-preemptive priority scheduler utilized in conjunction with a distributed application. The scheduler 44 monitors all of the threads within its respective node, and when it determines in Step 100 that at least one thread is ready to run and needs to access the CPU, it selects the ready thread which has the highest priority from among the ready threads. If more than one thread has that priority level, the thread which has waited the longest for the central processing unit is selected (Step 102). The selected thread is given access to the CPU and its function is run (Step 104). A higher priority thread may become ready to run while the selected thread is running. If the scheduler 44 determines in Step 106 that a higher priority thread is ready to run, processing for the selected thread is interrupted (Step 108), and processing is returned to Step 102, in which the higher priority thread will be selected for running. If no higher priority thread becomes ready to run, when the selected thread is determined to have completed running in Step 110, processing is returned to Step 100 for determining if any additional thread is ready to run.

Figure 4:
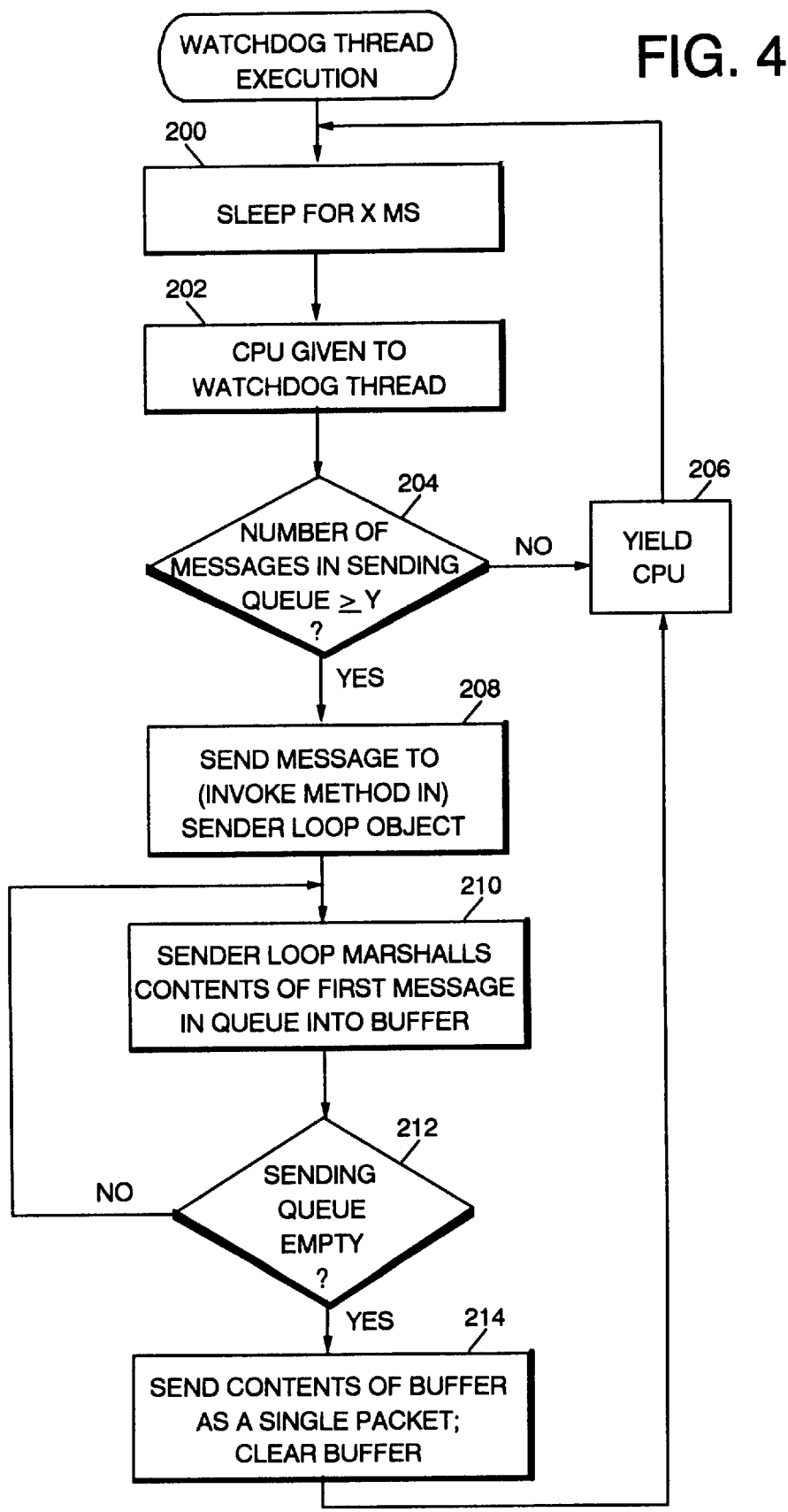
FIG. 4 illustrates a flowchart for a watchdog thread associated with a sender loop thread in accordance with the present invention.

FIG. 4 illustrates the logical steps carried out by the watchdog thread 52. The watchdog thread 52 is responsible for invoking the sender loop 42 when a sufficient number of messages are in the sending queue 46 to make batching worthwhile. Essentially, the watchdog thread 52 is polled at regular intervals, such as 50 milliseconds. The concept of polling is known, and will not be further discussed. What essentially happens is that the scheduler 44 gives the CPU to the watchdog thread 52 at regular intervals. Preferably, the watchdog thread 52 is given CPU access at intervals which are relatively long compared to existing polling schemes associated with distributed applications and sending messages. However, the watchdog thread 52 is given a relatively high priority level.

The watchdog thread serves as one of two ways in which the sender loop 42 can gain access to the CPU to cause the messages in the sending queue 46 to be sent. After sleeping for the predetermined period of time, such as 50 milliseconds (Step 200), the scheduler 44 allots the CPU to the watchdog thread (Step 202). The watchdog thread then determines in Step 204 whether or not the number of messages in the sending queue 46 is equal to or exceeds a predetermined number. If the number of messages is not equal to or greater than the predetermined number, the watchdog thread 52 yields its access to the CPU (Step 206) and returns to Step 200 and its sleep mode. Alternatively, if it is determined in Step 204 that the number of messages in the sending queue is equal to or exceeds the predetermined number, then a message is sent to the sender loop 42, invoking a method in the sender loop object (Step 208).

By invoking the method, the watchdog thread 52 essentially performs the equivalence of the sending operation of the sender loop 42 at high priority, in accordance with the nature of object oriented applications. The sender loop processing then causes the messages in the sending queue 46 to be sent. The contents of the first message in the sending queue 46 are marshalled into the buffer 48 in accordance with known techniques (Step 210). Processing then determines whether or not the sending queue 46 is empty (Step 212). If it is not empty, the processing returns to Step 210 to process the next message in the sending queue 46. When it is finally determined in Step 212 that the sending queue is indeed empty of messages, processing proceeds to Step 214, in which the contents of the buffer 48 are sent as a single packet across the network 32 to the receiving node 34, and the buffer 48 is cleared. The sender loop then yields the CPU (Step 206).

The watchdog thread 52 thereby ensures that messages will not pile up in the sending queue 46 for any great length of time if the number of messages has reached a number deemed to provide performance enhancement and provides the performance benefits associated with batching. For example, in a typical node, 10 to 15 threads may be operating. Batching three messages together for sending at one time may be appropriate. However, given that different applications may have different optimizations, the number of messages in the queue 46 required to initiate the sender loop 42 is preferably modifiable by the system administrator or application developer. Similarly, it is preferred that the priority level be modifiable. The steps involved with modifying a variable during application development or run-time are well known, and will not be described in detail herein. So, while the initial batching number and priority level are preferably set to defaults, they are preferably changeable in order to enhance performance.

Figure 5:
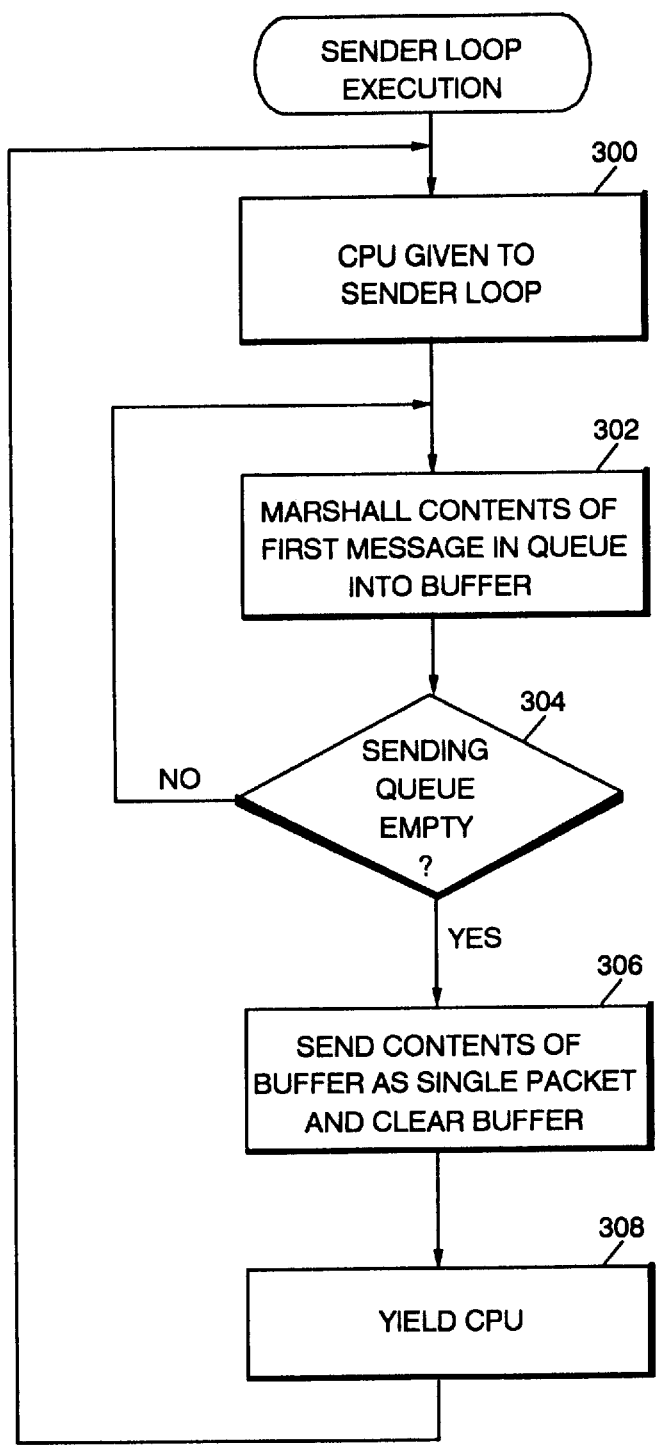
FIG. 5 is a flowchart which illustrates the operation of a sender loop thread in accordance with the present invention.

Referring now to FIG. 5, the processing which occurs in the sender loop 42 will now be described. The sender loop 42 is preferably given a relatively low priority and is not regularly polled. When one of the application threads 36, 38, 40 in the sending node 30 sends a message bound for the receiving node 34 to the sending queue 46, a semaphore is set in accordance with known techniques such that the scheduler 44 now knows that a message is waiting in the sending queue 46 for sending by the sender loop 42 to the receiving node 34. When no message is in the sending queue 46, the scheduler 44 will know that the sender loop 42 is not ready to run and does not need CPU access. In accordance with the present invention, the existence of a message in the sending queue 46 is not in and of itself a high priority process. Accordingly, the sender loop 42 is provided with a relatively low priority level with respect to most of the other threads within the sending node 30. The result is that if there is any other processing within the sending node 30 to be run which is at all significant, it will be run prior to a message (or number of messages less than the predetermined number for batching as per the watchdog thread 52) in the sending queue 46 being sent. However, if a time arrives within the sending node 30 that all other higher priority threads have been blocked (e.g., waiting for input/output or a remote message to return), the scheduler 44 gives the sender loop 42 access to the CPU to send whatever is in the sending queue 46 at that time.

When this occurs, as per step 300, the CPU is given to the sender loop 42. The sender loop 42 will then marshall the contents of the first message in the sending queue 46 into the buffer 48 in accordance with known techniques (Step 302). Processing then determines whether or not the sending queue 46 is empty (Step 304). If the queue 46 is not empty, the processing returns to Step 302 for the next message in the sending queue. When it is finally determined in Step 304 that the sending queue is indeed empty of messages, processing proceeds to Step 306, in which the contents of the buffer 48 are sent as a single packet across the network 32 to the receiving node 34, and the buffer 48 is cleared. The sender loop then yields the CPU (Step 308).

It should be noted that the watchdog thread 52 will preferably have a higher priority than the sender loop 42 and the application threads 36, 38, 40. This scheme attempts to optimize the execution of the distributed application, in that when a sufficient number of messages have arrived in the sending queue 46 to make batching worthwhile, the watchdog thread 52 will gain access to the CPU quickly and perform the send method in the sender loop 42 to send the batched messages as a single packet over the network 32. This, of course, enhances performance of the overall execution of the distributed application when the sending node 30 is busy. In addition, the sender loop 42 will gain access to the CPU based upon its own priority when there are messages waiting to be sent in the sending queue 46 and processing within the sending node 30 is at a minimum. This may occur when one of the application threads 36, 38, 40 has sent a message to the sending queue 46 and has blocked its processing and is waiting for a response back from the receiving node 34 before it continues processing. Thus, situations may occur when a single message may be sent by the sending node 30 over the network 32; however, this will only occur when the processing within the sending node 30 is at a minimum. Thus, the processing within the sending node 30 is not be forced to wait until a full batch of messages are ready to be sent off across the network. This utilizes the CPU of the sending node when processing is at a minimum within the sending node 30, which helps to ensure that processing within the sending node 30 will not be held up unnecessarily when an insufficient number of messages are within the sending queue 46 to be sent as a batch.

This combination of techniques for the sender loop 42 to gain access to the CPU results in enhanced performance of the distributed application as a whole. Since slow processing times within the sending node are accounted for, delays will not be mandated by a batching-only sending scheme. Batching is still prioritized if and when a sufficient number of messages are ready to be sent While the present invention has been described in terms of an object oriented distributed application, the basic techniques described herein are applicable to many types of distributed applications. Thus, while the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. In a computing environment executing a distributed application in at least a first address space and a second address space, a system for causing a sender thread in the first address space to send messages intended for the second address space to the second address space via a network, comprising:

a sending queue in the first address space for receiving messages from threads in the first address space bound for the second address space;

first means for determining whether a number of messages in said sending queue is greater than or equal to a predetermined number, and if so, causing the sender thread to send the messages in said sending queue to the second node in a single packet; and second means for determining whether at least one message is present in said sending queue, and if so, and if no higher priority thread is ready to run, causing the sender thread to send all of the messages in the said sending queue to the second address space in a single packet.

2. A system according to claim 1, wherein said first means is a thread having a higher priority for being executed than said second means.

3. A system according to claim 1, further comprising third means for permitting a user to change the predetermined number.

4. Computer readable code for sending messages from a first node to a second node, comprising:

first subprocesses in the first node for determining whether a number of messages in a send queue is equal to at least a predetermined number, and if so, causing the messages to be sent to the second node; and second subprocesses in the first node for causing all messages in the send queue to be sent to the second node when at least one message is in the send queue.

5. Computer readable code for sending messages according to claim 4, wherein the first and second nodes are carrying out processing for a distributed application.

6. Computer readable code for sending messages according to claim 5, wherein the distributed application is an object oriented application.

7. Computer readable code according to claim 4, wherein said first subprocesses have a higher priority for being executed than said second subprocesses.

8. Computer readable code for sending messages according to claim 4, further comprising third subprocesses for permitting the predetermined number to be modified by a user.

9. Computer readable code for sending messages according to claim 4, wherein the messages are sent from the first node to the second node via a network.

10. Computer readable code for sending messages according to claim 9, wherein both said first subprocesses and said second subprocesses send all messages in the send queue over the network to the second node in a single packet.

11. A method for sending messages from threads in a first node bound for a second node, comprising the steps of:

receiving messages bound for the second node from the threads of the first node in a send queue in the first node;

determining whether a number of messages in the send queue is equal to at least a predetermined number and, if so, causing the messages to be sent to the second node, said determining step having a first priority for execution;

setting a semaphore so that a scheduler which delegates processing time to threads in the first node knows that a message is waiting to be sent in the send queue when the send queue receives a message from one of the threads; and sending any messages in the send queue to the second node in response to setting of the semaphore, said sending step having a second priority for execution.

12. A method for sending messages according to claim 11, wherein the first priority for execution is higher than the second priority for execution.

13. A method for sending messages according to claim 11, further comprising the step of permitting the predetermined number to be modified by a user.

14. A method for sending messages according to claim 11, wherein said sending step further comprises sending the messages to the second node in a single packet.

* * * * *